(12) United States Patent
Wu

(10) Patent No.: US 6,694,055 B2
(45) Date of Patent: *Feb. 17, 2004

(54) PROPER NAME IDENTIFICATION IN CHINESE

(75) Inventor: Andi Wu, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 32 days.

This patent is subject to a terminal disclaimer.

(21) Appl. No.: 09/116,560

(22) Filed: Jul. 15, 1998

(65) Prior Publication Data

US 2002/0003898 A1 Jan. 10, 2002

(51) Int. Cl.⁷ .................................................. G06K 9/18
(52) U.S. Cl. ........................ 382/185; 382/177; 382/187; 382/218; 704/9; 707/2
(58) Field of Search .................................. 382/185, 187, 382/198, 218, 228, 310, 181, 186, 229, 231, 305; 707/2, 6, 5; 704/1, 2, 4–5, 7–10

(56) References Cited

U.S. PATENT DOCUMENTS

| | | | |
|---|---|---|---|
| 4,750,122 A | 6/1988 | Kaji et al. ...................... 704/1 |
| 4,850,026 A | * 7/1989 | Jeng et al. ................... 382/185 |
| 4,887,212 A | 12/1989 | Zamora et al. ................. 704/8 |
| 4,942,526 A | 7/1990 | Okajima et al. .............. 704/10 |
| 5,029,084 A | 7/1991 | Morohasi et al. .............. 704/9 |
| 5,077,804 A | 12/1991 | Richard ....................... 382/138 |
| 5,448,474 A | 9/1995 | Zamora ................... 364/419.1 |
| 5,454,046 A | * 9/1995 | Carman, II .................. 382/187 |
| 5,473,607 A | 12/1995 | Hausman et al. ........... 370/392 |
| 5,651,095 A | 7/1997 | Ogden ......................... 704/260 |
| 5,694,523 A | 12/1997 | Wical ............................ 706/45 |
| 5,740,549 A | 4/1998 | Reilly et al. ................... 705/14 |
| 5,787,197 A | * 7/1998 | Beigi et al. .................. 382/187 |
| 5,806,021 A | 9/1998 | Chen et al. ..................... 704/9 |
| 5,850,480 A | * 12/1998 | Scanlon ....................... 382/187 |
| 5,917,941 A | 6/1999 | Webb et al. ................. 382/177 |
| 5,923,778 A | * 7/1999 | Chen et al. .................. 382/187 |
| 5,933,525 A | * 8/1999 | Makhoul et al. ............ 382/185 |
| 5,940,532 A | * 8/1999 | Tanaka ........................ 382/187 |

(List continued on next page.)

FOREIGN PATENT DOCUMENTS

| | | | |
|---|---|---|---|
| EP | 0 653 736 A1 | 5/1988 | ............ G08B/5/22 |
| EP | 0 650 306 A1 | 10/1994 | ............ H04Q/7/32 |
| WO | WO 95/12955 | 5/1995 | ............ H04Q/7/00 |
| WO | WO 97/17682 | 5/1997 | ............ G08B/5/22 |
| WO | WO 97/35402 | 9/1997 | ............ H04L/9/00 |
| WO | WO 98/08169 | 2/1998 | |

OTHER PUBLICATIONS

Coates–Stephens "The Analysis and Acquisition of Proper Names for the Understanding of Free Text", Computers and the Humanities, vol. 26, 441–456, 1993.*

(List continued on next page.)

*Primary Examiner*—Daniel Mariam
(74) *Attorney, Agent, or Firm*—Westman, Champlin & Kelly, P.A.; T. Franek

(57) ABSTRACT

A word segmentation method to identify proper names in input text includes locating a sequence of single-characters in the input text not forming part of a multiple-character word. The method further includes comparing the sequence of single-characters to a lexical knowledge base to identify if a first portion of the sequence corresponds to stored identifiable portions of a proper name, and comparing the sequence of single-characters to the lexical knowledge base to identify if a second portion of the sequence proximate the first portion includes characters known to comprise a second portion of a proper name. Instructions can be provided on a computer readable medium to implement the method.

45 Claims, 7 Drawing Sheets

U.S. PATENT DOCUMENTS

| | | | | |
|---|---|---|---|---|
| 6,014,615 A | * | 1/2000 | Chen | 704/3 |
| 6,035,268 A | | 3/2000 | Carus et al. | 704/9 |
| 6,073,146 A | * | 6/2000 | Chen | 707/535 |
| 6,173,253 B1 | | 1/2001 | Abe et al. | 704/10 |
| 6,182,029 B1 | | 1/2001 | Friedman | 704/9 |
| 6,298,343 B1 | * | 10/2001 | Chang et al. | 707/5 |
| 6,363,342 B2 | | 3/2002 | Shaw et al. | 704/220 |
| 6,374,210 B1 | | 4/2002 | Chu | 704/9 |

OTHER PUBLICATIONS

Yhap, et al. "An On–Line Chinese Character Recognition System", IBM J. Res. Develop. vol. 25, No. 3, pp. 187–189, May 1991.*

Coates–Stephens "The Analysis and Acquisition of Proper Names for Robust Text Understanding", Dept. of Computer Science, City University, London, England, Oct. 1992, pp. 1–8, 28–38, 113–133, and 200–206.*

"Automatic Recognition of Person Names Based on Corpus and Rule–Base" (English translation is provided), taken from Phrases, Articles and Tools (A Collection of Theses of Chinese Information Processing) 1991–1998 The Artificial Intelligence Lab of Beijing Computer Institute Nov. 1998.

Kuo, et al. "A New Method for the Segmentation of Mixed Handprinted Chinese/English Characters", IEEE, pp. 810–813, 1993.

Lua, et al. "An application of Information Theory in Chinese Word Segmentation", Computer Pocessing of Chinese & Oriental Languages, pp. 1–9, 1997.

Chen et al. "Chinese Text Retrieval Without Using Distionary", ACM, pp. 42–49, 1997.

Palmer et al. "Chinese Word Segmentation and Information Retrieval", AAAI Spring Symposium on Cross–Language Text and Speech Retrieval, pp. 1–6, 1997.

Packard New Approaches to Chinese Word Formation: Morphology, Phonology and the Lexicon in Modern and Ancient Chinese. Mouton de Gruyter, New York,1998.

Chi et al. Word Segmentation and Recognition for Web Document Framework: ACM, pp. 458–465, Jan. 1999.

GE et al. Discovering Chinese Words from an Unsegmented Text, ACM, pp. 271–272, Jan. 1999.

Chen et al., "Word Identification for Mandarin Chinese Sentences", Proceedings of the 14th International Conference on Computational Linguistics (Coling '92), pp. 101–107, Nantes, France.

Wu et al., "Chinese Text Segmentation for Text Retrieval: Achievements and Problems", Journal of the American Society for Information Science, 44(9):532–542, 1993.

Chang et al., "A Multiple–Corpus Approach to Recognition of Proper Names in Chinese Texts", Computer Processing of Chinese and Oriental Languages, vol. 8, No. 1, Jun. 1994, pp. 75–85.

Sproat et al., "A Stochastic Finite–State Word Segmentation Algorithm for Chinese", Computational Linguistics, vol. 22, No. 3, pp. 377–404, 1996.

Teller et al., "A Probabilistic Algorithm for Segmenting Non–Kanji Japanese Strings", Proceedings National Conference on Artificial Intelligence, vol. 1, pp. 742–747, Jul. 31, 1994.

Jian–Yun Nie et al., "Unknown Word Detection and Segmentation of Chinese Using Statistical and Heuristic Knowledge", Communications of Colips, vol. 5, No. 1–2, pp. 47–57, Dec. 1995.

Gan et al., "A Statistically Emergent Approach for Language Processing: Application to Modeling Context Effects in Ambiguous Chinese Word Boundary Perception", Computational Linguistics, vol. 22, No. 4, pp. 531–553, 1996.

Anonymous, "Method of Segmenting Texts into Words", IBM Technical Disclosure Bulletin, vol. 39, No. 11, pp. 115–118, Nov. 1996.

Guo, J., "Critical Tokenization and its Properties", Computational Linguistics, vol. 23, No. 4, pp. 569–596, 1997.

Yuan et al., "Splitting–Merging Model for Chinese Word Tokenization and Segmentation", Department of Information Systems & Computer Sciences, National University of Singapore, pp. 309–324, 1998.

Xiaohong Huang et al., "A Quick Method for Chinese Word Segmentation", IEEE Conf. on Intelligent Processing Systems, Oct. 28–31, 1997, pp. 1773–1776.

Ching–Long Yeh et al., "Rule–Based Word Identification for Mandarin Chinese Sentences–A Unification Approach", Computer Processing of Chinese & Oriental Languages, vol. 5, No. 2, pp. 97–118, Mar. 1991.

Charng–Kang Fan and Wen–Hsiang Tsai, "Automatic Word Identification in Chinese Sentences by the Relaxation Technique", Computer Processing of Chinese and Oriental Languages, vol. 4, No. 1, Nov. 1988, pp. 33–56.

* cited by examiner

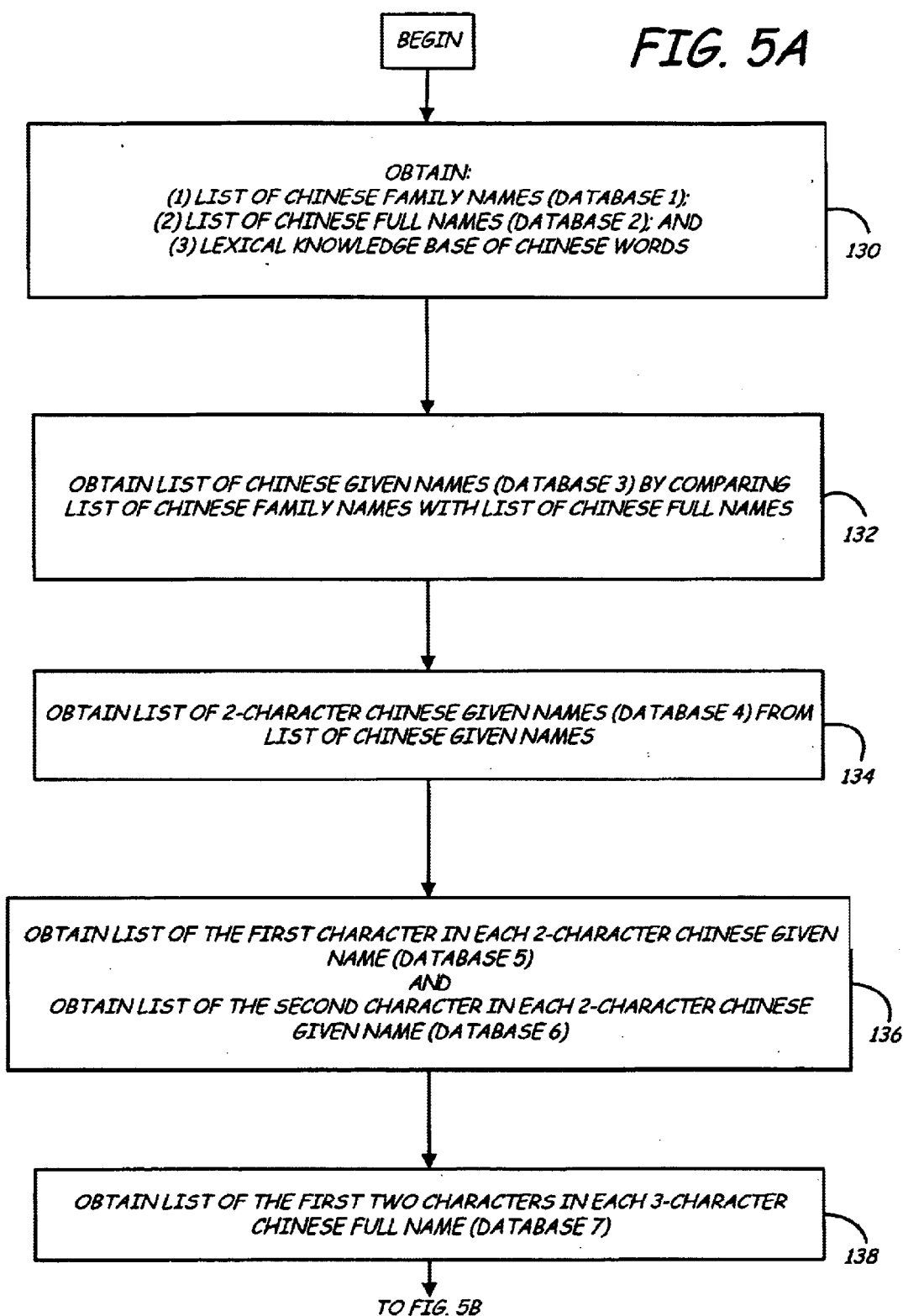

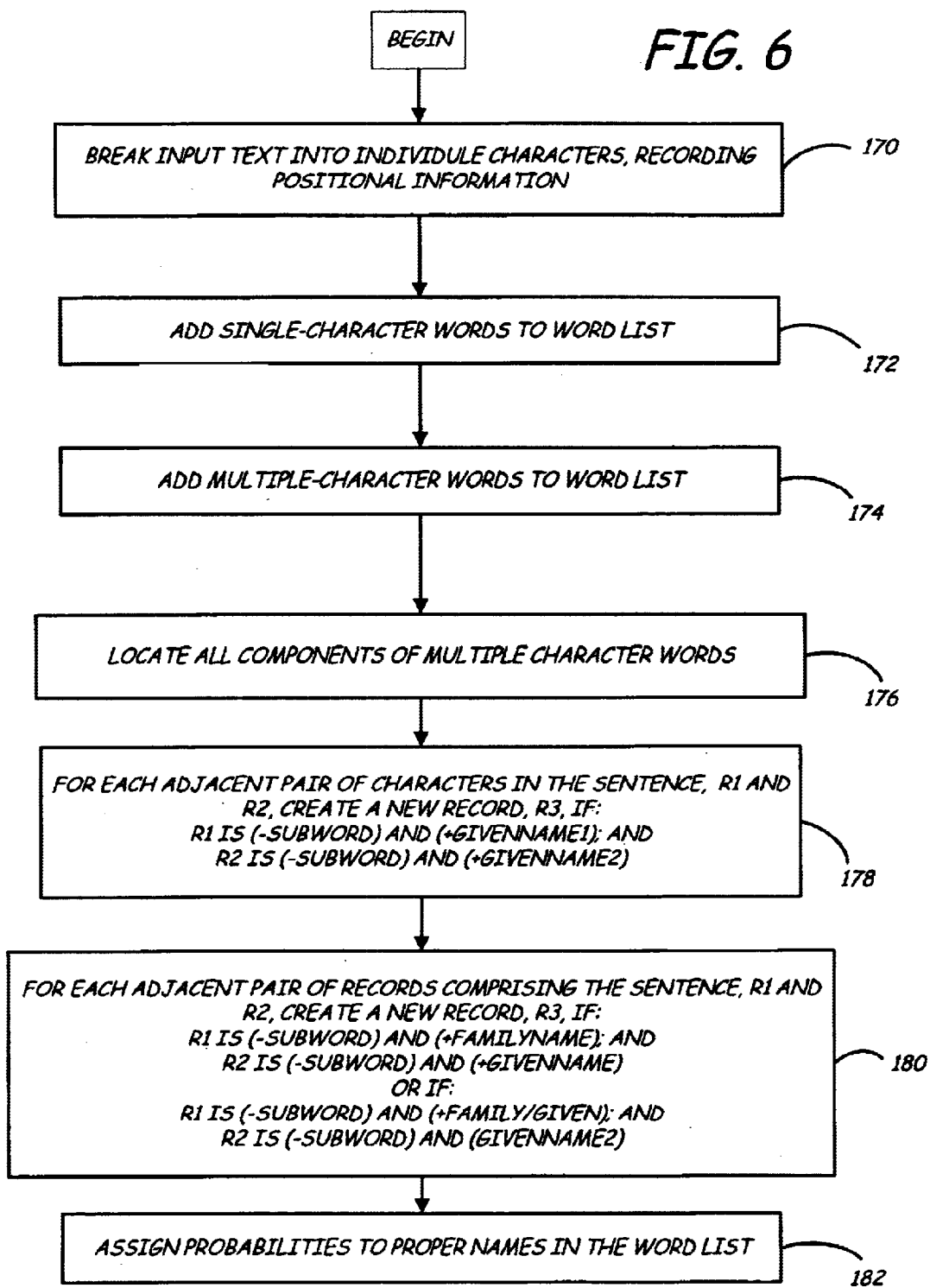

PROPER NAME IDENTIFICATION IN CHINESE

BACKGROUND OF THE INVENTION

The present invention relates generally to the field of natural language processing. More specifically, the present invention relates to word segmentation.

Word segmentation refers to the process of identifying individual words that make up an expression of language, such as in written text. Word segmentation is useful for checking spelling and grammar, synthesizing speech from text, speech recognition, information retrieval and performing natural language parsing and understanding.

Performing word segmentation of English text is rather straight forward, because spaces and punctuation marks generally delimit individual words in the text. However, in Chinese text, word boundaries are implicit rather than explicit. Consider the sentence in Table 1 below:

TABLE 1

| 王凯文来自南京。 |
| --- |

Despite the lack of punctuation and spaces in the sentence, a reader of Chinese would recognize the sentence in Table 1 as being comprised of the words shown below:

TABLE 2

| 王 | 凯文 | 来自 | 南京 |
| --- | --- | --- | --- |
| Wang | Kaiwen | come from | Nanjing | where 王凯文 can be treated as a single word (i.e. a proper name).

As shown above, proper names are written in ordinary Chinese characters with no special markings such as capitalization in English or in other European languages. In addition, there are no spaces or blanks in the text to separate proper names from other words. Chinese names also use characters that can form parts of other words, or can function as other nouns, verbs or adjectives in a different context. As a result, proper names are "hidden" in Chinese text, which creates a serious problem for the processing of Chinese text. It has been estimated that about 2% of average Chinese text are proper names, but they are the cause of at least 50% of errors made by state-of-art segmentation systems. Therefore, an accurate and efficient approach to automatically perform segmentation with proper name recognition would have significant utility.

SUMMARY OF THE INVENTION

A first aspect of the present invention is a word segmentation method to identify proper names in input text. The method includes locating a sequence of single-characters in the input text not forming a part of a multiple-character word. The method further includes comparing the sequence of single-characters to a lexical knowledge base to identify if a first portion of the sequence corresponds to stored identifiable portions of a proper name, and comparing the sequence of single-characters to the lexical knowledge base to identify if a second portion of the sequence proximate the first portion includes characters known to comprise a second portion of a proper name.

A second aspect of the present invention is a method to identify non-Chinese originated names contained in Chinese text. The method includes locating a sequence of three or more single-characters in input text not forming a part of a multiple-character word, and comparing the sequence of single-characters to a lexical knowledge base to identify if characters contained in the sequence correspond to characters used in non-Chinese originated names.

A third aspect of the present invention includes a method for creating a lexical knowledge base for identifying proper names in input text. The method includes comparing a list of full proper names to be identified and a list of known portions of the full proper names and removing from each of the proper names any known portions contained therein to obtain a list comprising remaining portions of the full proper names. Indications are stored in the lexical knowledge base for the list of full proper names, for the list of known portions of the full proper names, for the list of remaining portions of the full proper names and positional information of characters in each of the remaining portions of the full proper names.

Instructions can be provided on a computer readable medium to implement any of the above-mentioned methods.

A fourth aspect of the present invention is a computer readable medium comprising a lexical knowledge base for use in identifying proper names in input text. The lexical knowledge base includes, for each of a plurality of words, an indication that the word corresponds to a first portion of a proper name, and for each of a plurality of characters, an indication that the character is a part of a second portion of a proper name.

A fifth aspect of the present invention is a computer readable medium comprising a lexical knowledge base for using in identifying non-Chinese originated names in Chinese names. The lexical knowledge base includes, for each of a plurality of characters, an indication that the character is a part of a non-Chinese originated name.

BRIEF DESCRIPTION OF THE DRAWINGS

FIGS. 5A and 5B are flow diagrams illustrating augmentation of the lexical knowledge base.

FIG. 6 is a flow diagram illustrating word segmentation.

DETAILED DESCRIPTION OF THE PREFERRED EMBODIMENTS

The present invention relates to word segmentation with proper name recognition for unsegmented languages, such as Chinese. As used herein, a "proper name" includes a full name of an individual having a first name or a given name, and a last name or a family name. A proper name, as used herein, also includes place or geographical names, such as counties, cities, provinces, rivers, lakes, mountains, etc., as well as institutional names, such as company names and names of governmental bodies.

Recognition of a proper name in unsegmented text includes recognizing or locating an identifiable word of the input text in a lexical knowledge base. The identifiable word can be the individual's last name or title, a portion of the institution or corporate name, or a descriptive word of a geographical location. Recognition of a proper name also includes identifying in an adjacent word proximate the identifiable word, characters known to be in the individual's first name, the governmental name, the corporation's name, the geographical name, etc. Another aspect of the present invention includes locating other foreign originated names, such as European or English names, in Chinese text by the length of the name and the type of characters used therein.

Figure 1:
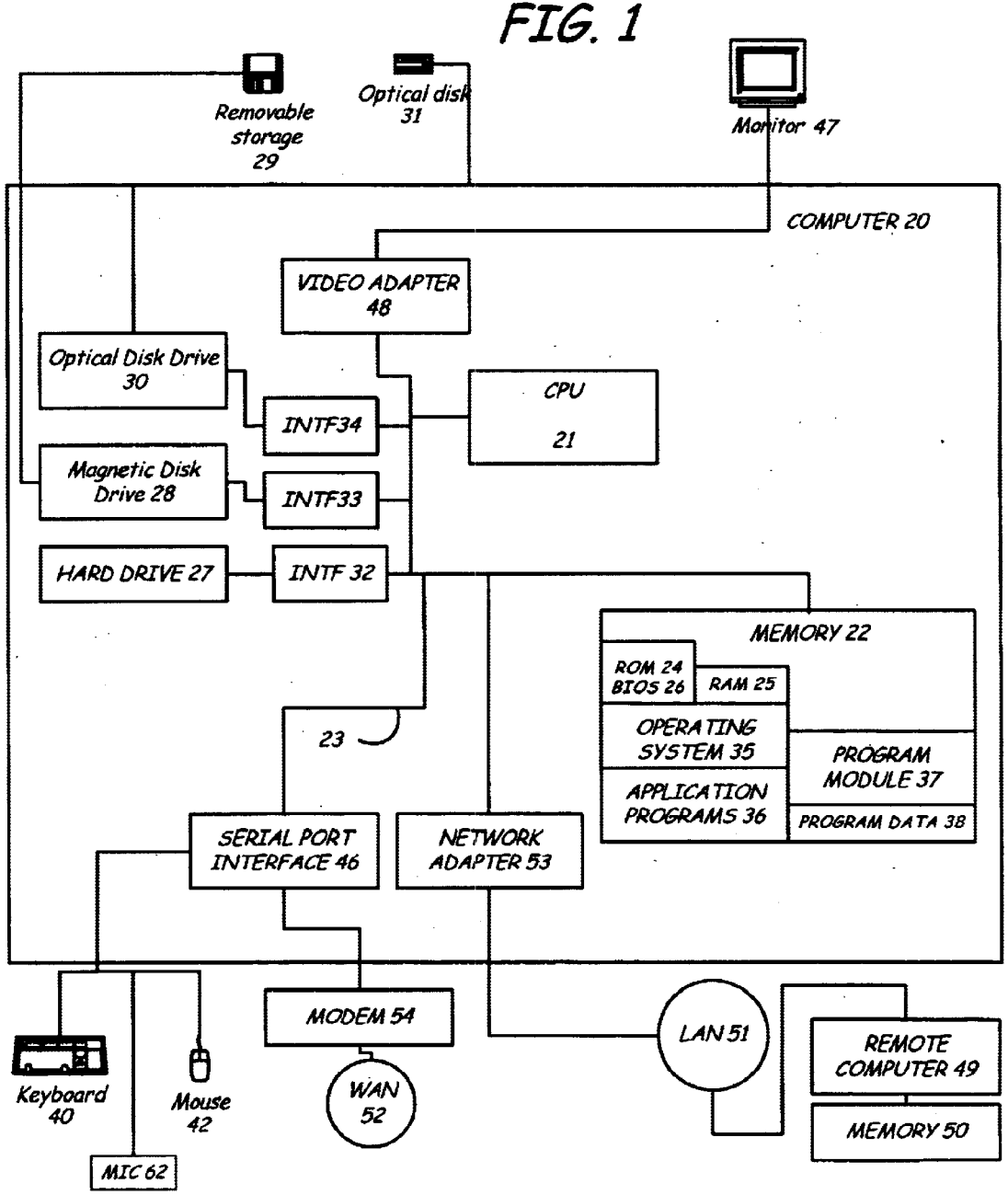
FIG. 1 is an exemplary operating environment for the present invention.

Prior to a detailed discussion of the present invention, an overview of an operating environment may be helpful. FIG. 1 and the related discussion are intended to provide a brief, general description of a suitable computing environment in which the invention may be implemented. Although not required, the invention will be described, at least in part, in the general context of computer-executable instructions, such as program modules, being executed by a personal computer. Generally, program modules include routine programs, objects, components, data structures, etc. that perform particular tasks or implement particular abstract data types. Moreover, those skilled in the art will appreciate that the invention may be practiced with other computer system configurations, including handheld devices, multi-processor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a central processing unit 21, a system memory 22, and a system bus 23 that couples various system components including the system memory 22 to the central processing unit 21. The system bus 23 may be any of several types of bus structures including a memory bus or a memory controller, a peripheral bus, and a local bus using any of a variety of bus architectures. The system memory 22 includes read only memory (ROM) 24 and a random access memory (RAM) 25. A basic input/output system (BIOS) 26, containing the basic routine that helps to transfer information between elements within the personal computer 20, such as during start-up, is stored in ROM 24. The personal computer 20 further includes a hard disk drive 27 for reading from and writing to a hard disk (not shown), a magnetic disk drive 28 for reading from or writing to a removable magnetic disk 29, and an optical disk drive 30 for reading from or writing to a removable optical disk 31, such as a CD ROM or other optical media. The hard disk drive 27, magnetic disk drive 28, and optical disk drive 30 are connected to the system bus 23 by a hard disk drive interface 32, magnetic disk drive interface 33, and an optical drive interface 34, respectively. The drives and the associated computer-readable media provide nonvolatile storage of computer readable instructions, data structures, program modules and other data for the personal computer 20.

Although the exemplary environment described herein employs the hard disk, the removable magnetic disk 29 and the removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs) read only memory (ROM), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the personal computer 20 through input devices, such as a keyboard 40, a pointing device 42 and a microphone 62. Other input devices (not shown) may include a joystick, game pad, satellite dish, scanner, or the like. These and other input devices are often connected to the central processing unit 21 through a serial port interface 46 that is coupled to the system bus 23, but may be connected by other interfaces, such as a sound card, a parallel port, a game port or a universal serial bus (USB). A monitor 47 or other type of display device is also connected to the system bus 23 via an interface, such as a video adapter 48. In addition to the monitor 47, personal computers may typically include other peripheral output devices, such as a speaker and a printer (not shown).

The personal computer 20 may operate in a networked environment using logic connections to one or more remote computers, such as a remote computer 49. The remote computer 49 may be another personal computer, a server, a router, a network PC, a peer device or another network node, and typically includes many or all of the elements described above relative to the personal computer 20, although only a memory storage device 50 has been illustrated in FIG. 1. The logic connections depicted in FIG. 1 include a local area network (LAN) 51 and a wide area network (WAN) 52. Such networking environments are commonplace in offices, enterprise-wide computer network Intranets and the Internet.

When used in a LAN networking environment, the personal computer 20 is connected to the LAN 51 through a network interface or adapter 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a network environment, program modules depicted relative to the personal computer 20, or portions thereof, may be stored in the remote memory storage devices. It will be appreciated by those skilled in the art that the network connections shown are exemplary and other means of establishing a communications link between the computers may be used.

Figure 2:
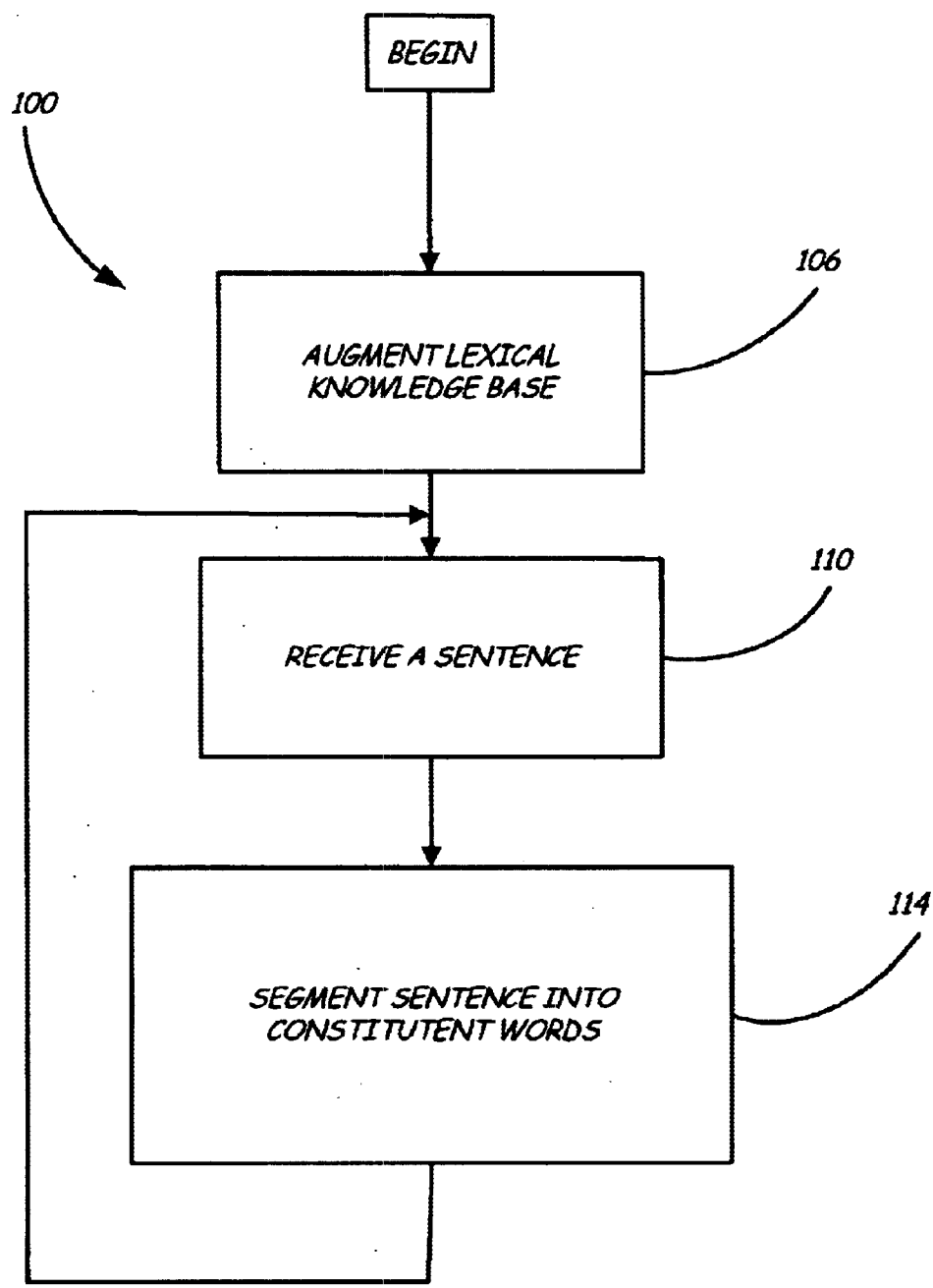
FIG. 2 is an overview flow diagram illustrating two aspects of the present invention.
Figure 3:
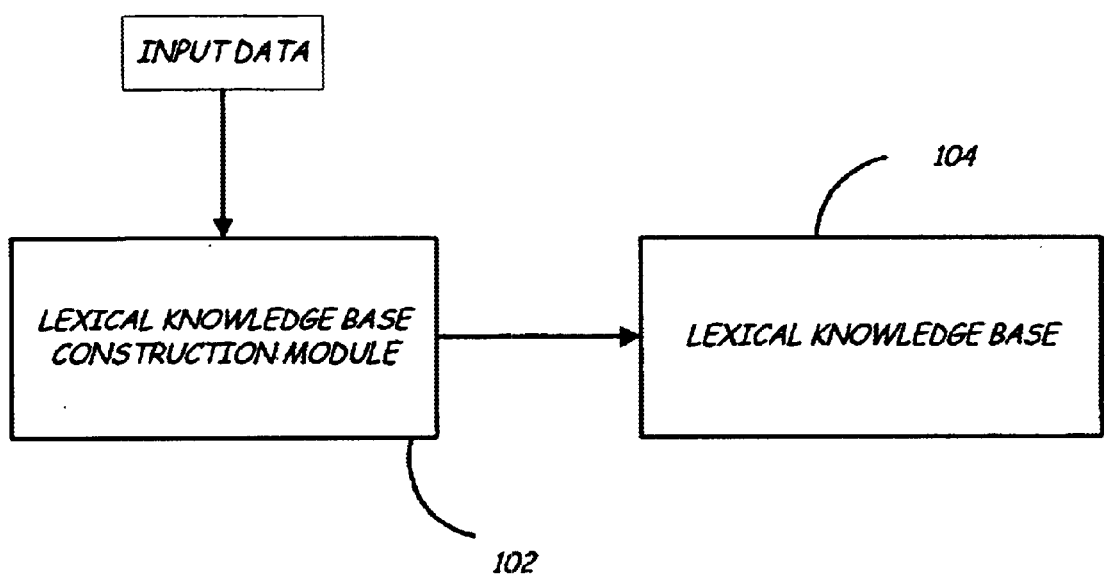
FIG. 3 is a block diagram of a system for augmenting a lexical knowledge base.
Figure 4:
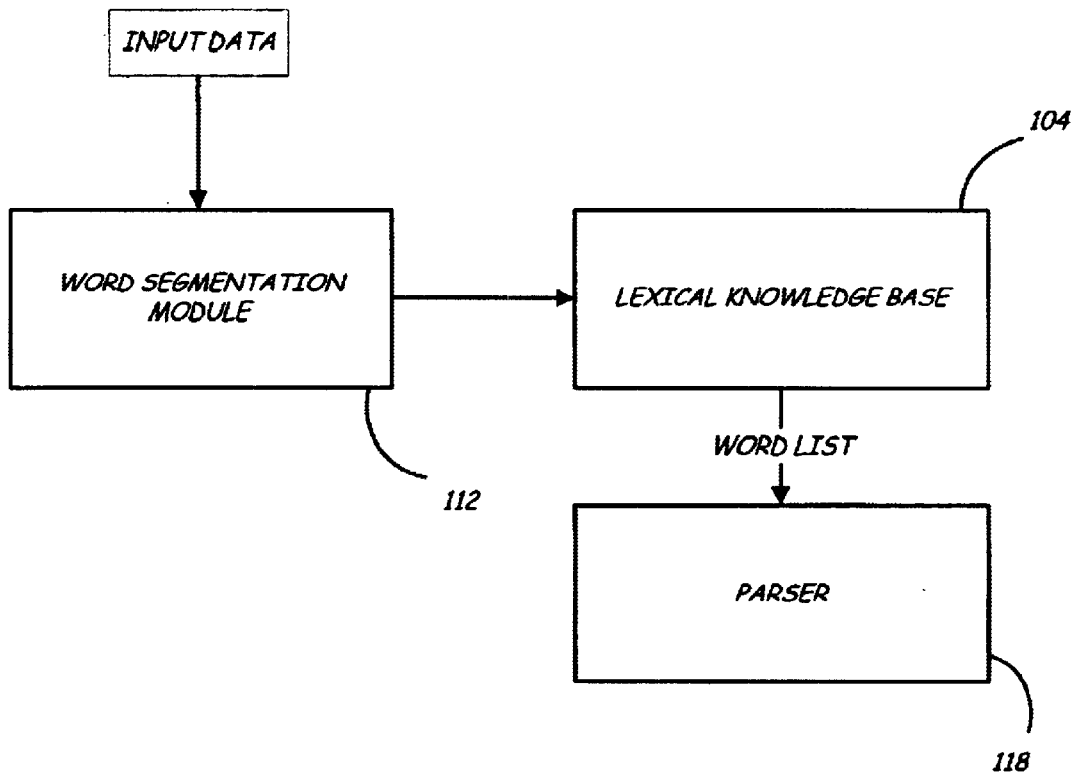
FIG. 4 is a block diagram of a system for performing word segmentation.

FIG. 2 is an overview flow diagram showing two aspects of the present invention embodied as a single method 100. FIGS. 3 and 4 are block diagrams illustrating modules for performing each of the aspects. Referring to FIGS. 2 and 3, a lexical knowledge base construction module 102 augments a lexical knowledge base 104 to include information used later to perform word segmentation with proper name recognition. The lexical knowledge base construction module 102 performs step 106 in method 100. Step 106 is discussed in greater detail below in conjunction with FIGS. 5A and 5B. Briefly, in step 106, the lexical knowledge base construction module 102 adds entries to the lexical knowledge base 104 for words indicative of proper names. In addition, the lexical knowledge base construction module 102 adds attributes for at least some of the entries, specifically words, in the lexical knowledge base 104 to indicate relevance of the word to a proper name. In a further embodiment, the lexical knowledge base 104 is also augmented to include entries comprising characters or sequences thereof having attributes to indicate use of the character or characters in a proper name. The lexical knowledge base construction module 102 receives input data to augment the lexical knowledge base 104 from any of the input devices described above as well from any of the data storage devices described above. The lexical knowledge base construction module 102 can be an application program 36 executed on the personal computer 20 or stored and executed on any of the remote computers in the LAN 51 or the WAN 52 connections. Likewise, the lexical knowledge base 104 can reside on the personal computer 20 in any of the local storage devices, such as the hard disk drive 27 or on an optical CD, or remotely in the LAN 51 or the WAN 52 memory devices.

After step 106, ending the initialization phase, the word segmentation phase begins. In the word segmentation phase, a word segmentation module 112 uses the information stored in the lexical knowledge base 104 to perform word segmentation of sentences of unsegmented languages. Using, by way of example, Chinese as an unsegmented language, the word segmentation module 112 receives input text, typically in the form of a written or spoken sentence, at step 110. In step 114, the word segmentation module 112 segments the received sentence into its constituent words. Step 114 is discussed in greater detail below in conjunction with FIG. 6. Briefly, the word segmentation module 112 looks up a small fraction of all of the possible contiguous combinations of characters in the sentence in the lexical knowledge base 104. The word segmentation module 112 submits a word list that is indicated to be words by the lexical knowledge base 104 to a syntactic parser 118. The word list includes words identified as possible proper names. The parser 118, in determining the syntactic structure of the sentence, identifies the words that were intended by the author to comprise the sentence. The syntactic parser 118 provides, as an output, a signal indicative of the segmented sentence. After step 114, program flow returns to step 110 to receive the next sentence for word segmentation.

Figure 5B:
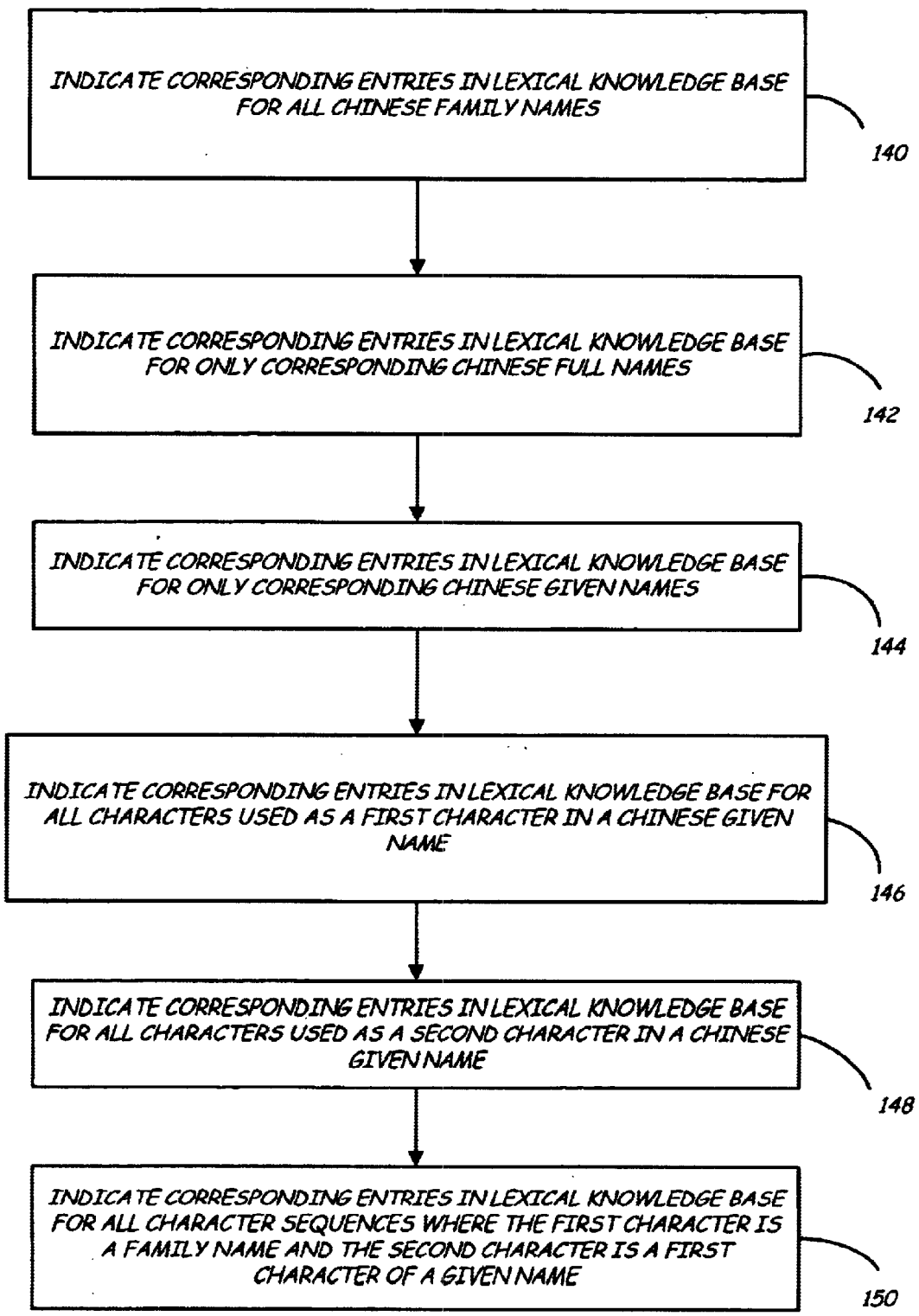

Augmentation of the lexical knowledge base 104 to include information relevant to the identification of proper names is illustrated in FIGS. 5A and 5B. An exemplary augmentation procedure will be described with reference to Chinese personal or full names. A similar procedure can be used for the other classes of proper names identified above.

To facilitate the explanation, a brief description of the structure of Chinese names may be helpful. Like full names in other languages, Chinese names are also composed of two parts: a family name and a given name. The family name is similar to the last name in English and European languages, while the given name is similar to the first name in English and European languages. However, in Chinese, the family name is spoken or written before the given name.

The characters that can serve as family names in Chinese generally constitute a finite set. Many family names (approximately 500) are a single character. In addition, approximately 30 2-character family names also exist. Of the characters in the set of family names, approximately 100 names are used exclusively for family names, while other names can be used as other independent words.

A Chinese given name is either one character or two characters in length. Unlike the characters used in the family names, the characters used in given names form an open set, wherein potentially any character can be used in a given name. Practically, however, constraints exist. Phonological constraints dictate that the character sequence of the full name must sound good, while semantic constraints require that the character sequence should have a nice meaning. Therefore, in reality not every character in Chinese has been used in names, let alone every possible sequence of characters. Other languages, such as Japanese, have similarly constructed names.

It has been discovered that certain analysis of the characters in a sentence can reveal possible proper names contained therein. Again, using Chinese names by way of example, Chinese names can comprise a sequence of two, three or four characters. Generally, the method includes analyzing the first and second characters (if the character sequence is greater than two) to determine if the character or characters can be a family name. The other characters are analyzed to determine if they can serve as a given name. In a preferred embodiment, the characters that can potentially be the given name are analyzed with respect to their position in the potential given name, which will be clear upon explanation of the following examples.

For a 2-character sequence to be a potential full name, the first character in the sequence must be a single-character used as a family name and the second character of the sequence must be one of those single characters that can serve as a given name by itself.

Similarly, for a 4-character sequence to be a potential full name, the first two characters must be one of the 2-character family names, and the remaining two characters of the sequence must be characters used in a given name. In a preferred form of analysis, the third character of the sequence must be one of those characters that can appear as the first character of a 2-character given name, while the fourth character of the sequence must be one of those characters that can appear as the second character of a 2-character given name.

For a 3-character sequence to be a potential full name, two possibilities exist. The first character of the sequence must be one used by itself as a family name, or the first two characters of the sequence must be one of those family names having 2-characters. If the first character of the sequence is, by itself, a family name, then the remaining characters must be a given name. In a preferred form of analysis, the second character of the sequence must be one of those characters that can appear as the first character of a 2-character given name, and the third character must be one of those characters that can appear as the second character of a 2-character given name. However, if the first two characters of the sequence comprise a family name, then the third character of the sequence must be one of those single characters that can serve as a given name by itself.

In the preferred form of analysis described above, the characters of the sequence are analyzed with respect to being a family name and a given name. With respect to family names, the characters used in family names are well defined, thereby making this step of the analysis relatively straight forward. However, since a given name can potentially be any character, analysis of the given name is considerably more difficult. In a preferred form of the present invention, analysis of the given name includes determining if the character has been used before in a given name. In yet a further preferred embodiment, in order to limit the potential names that must be considered by the parser 118, the character is considered to be able to appear in a certain position of a potential given name, if it has been observed in that position in existing names.

It must also be understood that a full name may contain a 2-character or 3-character sequence that is an independent word in the lexical knowledge base 104. For a 3-character full name, for example, the first two characters can form an existing word; the second two characters can form an existing word; or the whole name is an existing word. Preferably, to cover such cases, a character sequence is also proposed as a full name and added to the word list provided to the parser 118 if any of the following conditions are present:

For a sequence comprising two single characters followed by a 2-character word, the 2-single characters must form one of the 2-character family names, and the 2-character word has been used as a given name in existing names;

For a sequence comprising a single character followed by a 2-character word, the first character of the sequence must be a family name, and the 2-character word has been used as a given name in existing names;

For a sequence comprising a 2-character word followed by a single character, the 2-character word must correspond to a single character family name followed by a character that has been used as the first character of a given name in existing names, and the last character of the sequence has been used as the second character of a given name in existing names; or For a sequence comprising a 2-character or a 3-character word, the word must correspond to an existing name.

As indicated above, the lexical knowledge base 104 stores character information for use in the above-described analysis. FIGS. 5A and 5B, together, comprise a flow diagram showing exemplary steps for augmenting the lexical knowledge base 104 in the initialization phase to include information used to perform word segmentation. Generally, the information includes indications as to which entries correspond to a full name, a partial name, a last name and a given name. In addition, indications are preferably provided as to characters used in given names and their respective positions therein.

Referring also to FIG. 2, the lexical knowledge base construction module 102 receives, at step 130, input data comprising a complete list of Chinese family names (hereinafter "database 1"); a list of existing Chinese full names (hereinafter "database 2") (The list of Chinese full names does not have to be complete; however, it should be a representative sample of Chinese full names); and an existing lexical knowledge base of Chinese words.

At step 132, a list of Chinese given names (hereinafter "database 3") is obtained from combining database 1 and database 2. Specifically, given names are obtained by matching each full name in database 2 against the family names in database 1 wherein the identified family name of each full name is removed and the remaining character sequence is stored in database 3. Duplicate names are not stored.

At step 134, a list of 2-character given names (hereinafter "database 4") are obtained by examining database 3.

At step 136, for each 2-character given name in database 4, the first character of the given name is stored in database 5 and the second character of each given name is stored in database 6.

At step 138, for each 3 character name in database 2, the first two characters are removed and stored as a 2-character sequence in database 7.

The existing lexical knowledge base 104 is then augmented in steps illustrated in FIG. 5B using the information obtained from steps 130, 132, 134, 136 and 138. Generally, the lexical knowledge base 104 includes values or attributes indicating lexical information with respect to each of the entries therein. The steps of FIG. 5B augment the lexical knowledge base 104 to include proper name information. Typically, boolean values can be used to store such information; however, if desired, other suitable values can also be used.

At step 140, for each entry in database 1, the lexical knowledge base 104 is examined to find a corresponding entry. If a corresponding entry is found, an attribute value (FamilyName bit) is set and stored in the lexical knowledge base 104, indicating that the entry corresponds to a family name. If any entries in database 1 are not found in the lexical knowledge base 104, the entries and attribute values are added to the lexical knowledge base 104.

At step 142, for each entry in database 2, the lexical knowledge base 104 is examined to find a corresponding entry. If a corresponding entry is found, an attribute value (Fullname bit) is set and stored in the lexical knowledge base 104, indicating that the entry corresponds to a full name. Any entries in database 2 that are not found in the lexical knowledge base 104 are not added to the lexical knowledge base 104.

At step 144, for each entry in database 3, the lexical knowledge base 104 is examined to find a corresponding entry. If a corresponding entry is found, an attribute value (Givenname bit) is set and stored in the lexical knowledge base 104, indicating that the entry corresponds to a given name. Any entries in database 3 that are not found in the lexical knowledge base 104 are not added to the lexical knowledge base 104.

At step 146, for each entry in database 5, the lexical knowledge base 104 is examined to find a corresponding entry. If a corresponding entry is found, an attribute value (GivenName1 bit) is set and stored in the lexical knowledge base 104, indicating that the entry corresponds to a first character of a given name. If any entries from database 5 are not found in the lexical knowledge base 104, the entries and attribute values are added to the lexical knowledge base 104.

At step 148, for each entry in database 6, the lexical knowledge base 104 is examined to find a corresponding entry. If a corresponding entry is found, an attribute value (GivenName2 bit) is set and stored in the lexical knowledge base 104, indicating that the entry corresponds to a second character of a given name. If any entries from database 6 are not found in the lexical knowledge base 104, the entries and attribute values are added to the lexical knowledge base 104.

At step 150, for each entry in database 7, the lexical knowledge base 104 is examined. All corresponding entries are given attribute values (Family/Given bit) indicating that the entries correspond to 2-character sequences where the first character is a family name and the second character has been used as the first character of a given name. Any entries in database 7 that are not found in the lexical knowledge base 104 are not added to the lexical knowledge base 104.

FIG. 6 is a flow diagram of steps performed by the word segmentation module 112 and parser 118, (illustrated in FIG. 4) in order to segment a sentence into constituent words. Steps performed by the word segmentation module 112 generate a word list identifying different words, including proper names as described below, that can occur in the sentence. The word list is then submitted to the parser 118 to identify the subset of words in the word list that comprise the sentence.

At step 170, the word segmentation module 112 receives the input sentence and breaks the sentence apart into individual characters, recording positional information of each character in the sentence. As is known in the art, the parser 118 receives positional information of each word in the word list. Typically, each of the characters of the input sentence is numbered sequentially from the beginning to the end of the sentence. Using this positional information, a starting position of a possible word and an ending position of the possible word are determined for each word in the word list and are provided to the parser 118. Using, by way of example, the sentence of Table 1, individual characters are identified as indicated in Table 3 below:

TABLE 3

王凯文来自南京。

At steps 172 and 174, the word segmentation module 112 adds single-character words and multiple-character words to the word list. Each of these steps are described in detail in co-pending application entitled "WORD SEGMENTATION IN CHINESE TEXT" filed on May 29, 1998, and assigned Ser. No. 09/087,468, the content of which is hereby incorporated by reference. Generally, steps 172 and 174 ascertain possible non-proper name words in the word list. For single character words, the word segmentation module 112 determines, based on examination of the lexical knowledge base 104, whether each character in the sentence can be a single-character word. If the character can be a single-character word, the word segmentation module 112 adds the character to the word list, else the word segmentation module 112 examines the next character in the sentence.

At step 172, attribute values stored in the lexical knowledge base 104 and related to proper names are accessed for each character. Table 4, below, is a list of records of each of the single-characters in the input sentence of Table 3 with corresponding attributes that have been set.

TABLE 4

| 王 | FAMILY NAME | GivenName1 | | |
|---|---|---|---|---|
| 凯 | GivenName | GivenName1 | GivenName2 | |
| 文 | FamilyName | GivenName | GivenName1 | GivenName2 |
| 来 | GivenName | GivenName1 | GivenName2 | |
| 自 | GivenName | GivenName1 | GivenName2 | |
| 南 | FamilyName | GivenName | GivenName1 | GivenName2 |
| 京 | GivenName | GivenName1 | GivenName2 | |

In table 4, the presence of an attribute indicates that the single character has that attribute, while the absence of an attribute indicates that the single-character lacks the corresponding attribute.

At step 174, the word segmentation module 112 processes the sentence to locate multiple-character words, and adds such words to the word list. In the embodiment described in the co-pending application, the lexical knowledge base 104 includes information pertaining to multiple-character words. Specifically, the lexical knowledge base 104 includes indications of all of the different combinations of word length and character position in which the character appears, and an indication of all of the characters that may follow this character when this character begins a word. The lexical knowledge base 104 also preferably includes indications of whether subwords within the multiple-character words are viable and should be considered. In processing the sentence, the word segmentation module 112 discards combinations of characters in which any character is used in a word length/position combination not occurring in the lexical knowledge base 104, and combinations of characters in which the second character is not listed as a possible second character of the first character. The word segmentation module 112 further discards (removes from the word list, if previously added) subwords occurring in a word for which subwords are not to be considered. In this manner, the word segmentation module 112 minimizes the number of possible words provided to the parser 118. It should be noted that multiple-character words found in step 174 may also be proper names as stored in the lexical knowledge base 104 at step 142 (FIG. 5B).

At step 176, each of the component characters for each of the multiple-character words in the word list located by step 174 are assigned an attribute value (Subword bit) to indicate that the corresponding character has been subsumed by a multiple-character word.

Table 5, below, indicates multiple-character words for the input sentence of Table 3 and associated attribute values as determined by examination of the lexical knowledge base 104.

TABLE 5

| 王 | FamilyName | GivenName1 | | |
|---|---|---|---|---|
| 凯 | GivenName | GivenName1 | GivenName2 | |
| 文 | FamilyName | GivenName | GivenName1 | GivenName2 |
| 来自 | | | | |
| 来 | GivenName | GivenName1 | GivenName2 | Subword |
| 自 | GivenName | GivenName1 | GivenName2 | Subword |
| 南京 | | | | |
| 南 | FamilyName | GivenName | GivenName1 | GivenName2 |
| | Subword | | | |
| 京 | GivenName | GivenName1 | GivenName2 | Subword |

Table 5 contains relevant name information for each entry in order to determine which, if any, of the character sequences pertain to a proper name. In particular, by first locating those characters forming multiple-character words, analysis can then be focussed on only the remaining single-character sequences. This minimizes processing time of the sentence. For purposes of discussion, each of the entries in Table 5 can be considered as a lexical record. As illustrated in Table 5, each record may have zero or more of the name-related attributes described above.

Steps 178 and 180 are used to identify possible names. In the steps described below, a +X is used to indicate that the X attribute is present for the lexical record, while −X is used to indicate that the X attribute is absent for the lexical record, wherein X is any of the attributes discussed above.

In step 178, adjacent single-character records not forming a part of a multiple-character word are analyzed to see if together they form a given name. If the adjacent single-character records do form a given name, a new record is created and the GivenName bit is set. Stated another way, adjacent single-character lexical records, R1 and R2, are combined together to form a new 2-character lexical record, R3, and the attribute value Givenname is set for R3 if: (A) R1 is −Subword and +GivenName1; and (B) R2 is −Subword and +GivenName2. Applying the aforementioned analysis of step 178 to each 2-character sequence of Table 3, only characters 王凯 and 文 are considered since characters 来自南 and 京 have the attribute Subword.

At step 180, possible full names are located. In particular, adjacent records forming the sentence, R1 and R2, including records created by step 178, are combined to create new records R3, and the FullName attribute is set in the new record(s) R3 if:

(a) R1 (usually a 1-character record) is −Subword and +Familyname; and (b) R2 (a 1-character record from the lexical knowledge base or a 2-character record, either from the lexical knowledge base or created by step 178) is −Subword and +Givenname;

or if:

(a) R1 (a 2-character record from the lexical knowledge base) is −Subword and +Family/Given; and (b) R2 (a 1-character record from the lexical knowledge base) is −Subword and +GivenName2.

Application of the test in step 180 to records 王 and 凯 produces a possible name 王凯. Likewise, application of the test in step 180 to records 王 and 凯文 (created by step 178) produces a possible name 王凯文 Thus, 王凯 and 王凱文 are added to the word list provided to the parser 118. It should be noted that in spite of the fact that almost every character in this example sentence can be used in a name, as indicated by Table 4, only a few of them meet the conditions expressed in steps 178 and 180. By only providing to the parser 118 those possible names that meet the conditions of steps 178 and 180, the number of possible sentence configurations which must be considered by the parser 118 is minimized.

At step 182, the word segmentation module 112 can assign probabilities to the possible full names found in the word list. Probabilities are preferably assigned in order that the parser 118 considers those words with high probability early in the parsing process, and reserves consideration of proper names with low probability for later in the parsing process. In this manner, if the parser 118 is successful with those words marked as high probability, parsing is completed earlier, and thus more efficiently. In one embodiment, probability of proper name words in the word list are assigned based on information on adjacent words. For instance, if a full name occurs next to a title such as "president", "director", etc., the full name word is assigned a high probability, otherwise the full name word is assigned a low probability.

Although described above with respect to identification of Chinese full names in sentences, it should be understood that the technique described above can be used for other proper names such as Japanese full names, geographical locations, city names, company names, etc. With respect to Japanese full names, family names are generally a finite set comprising one or two characters, whereas given names can be one to three characters in length. Geographical locations, and institutional names also can be detected using name analysis similar to family and given names. For example, company names usually include a designation such as "company", "corporation", "limited", "incorporated", to name a few. These designations are similar to a finite set of family names. Although a portion of the full company name varies widely from company name to company name, like given names described above, implicit constraints are usually present to limit the characters and character sequences in the company name. Therefore, the specific characters used in the company name as well as their respective positions in the company name can be used for analysis in a manner similar to that discussed above for given names, to identify company names in an unsegmented language.

Finally, West European names can also be located in Chinese text as another aspect of the present invention. Typically, West European names, when written in Chinese, comprise characters and sequences not present in other Chinese words. In addition, West European names when written in Chinese are generally long (three or more characters), whereas most Chinese words comprise four or less characters. (West European names that are composed of two characters only are stored in the lexical knowledge base 104 as independent entries.) Locating West European names in Chinese includes the steps of locating single-character sequences having three or more characters (where the subword bit has not been set), and examining the characters present in the sequence to ascertain whether such characters have been used before in West European names (this information having been stored in the lexical knowledge base 104). If these conditions are met, the character sequence is added to the word list and is presented to the parser 118. In addition, since Chinese words are usually four characters or less, a sequence of characters identified as a West European name can be assigned high probability in view that the length of the word and the characters contained in the word are unusual.

Although the present invention has been described with reference to preferred embodiments, workers skilled in the art will recognize that changes may be made in form and detail without departing from the spirit and scope of the invention.

What is claimed is:

1. A computer readable medium including instructions readable by a computer which, when implemented, cause the computer to identify proper names in input text by performing steps comprising:

locating a sequence of single-characters in the input text not forming part of a multiple-character word;

comparing the sequence of single-characters to a lexical knowledge base to identify if a first portion of the sequence corresponds to stored identifiable portions of a proper name; and comparing the sequence of single-characters to the lexical knowledge base to identify if a second portion of the sequence proximate the first portion includes characters known to comprise a second portion of a proper name;

locating non-proper name multiple-character words in the input text; and identifying characters of the input text comprising each of the multiple-character words.

2. The computer readable medium of claim 1 including instructions readable by a computer which, when implemented, cause the computer to perform steps comprising:

submitting the first portion and the second portion to a syntactic parser with other words; and parsing the input text with first portion, the second portion and the other words.

3. The computer readable medium of claim 1 including instructions readable by a computer which, when implemented, cause the computer to perform a step comprising:

assigning an indication of probability that the first portion and the second portion corresponding to a proper name.

4. The computer readable medium of claim 3 including instructions readable by a computer which, when implemented, cause the computer to assign the indication of probability as a function of words proximate the first and second portions.

5. The computer readable medium of claim 1 including instructions readable by a computer which, when implemented, cause the computer to perform a step comprising:

locating single-character words in the input text.

6. The computer readable medium of claim 1 including instructions readable by a computer which, when implemented, cause the computer in the step of comparing the sequence of single-characters to the lexical knowledge base to identify if the second portion of the sequence includes characters known to comprise the second portion of a proper name to do so as a function of character position.

7. The computer readable medium of claim 6 including instructions readable by a computer which, when implemented, cause the computer to include in the step of comparing the sequence of single-characters to the lexical knowledge base to identify if the second portion of the sequence includes characters known to comprise the second portion of a proper name, a step comprising:

forming a record if adjacent single-characters are known to comprise the second portion as a function of character position.

8. The computer readable medium of claim 1 including instructions readable by a computer which, when implemented, cause the computer to identify proper names in unsegmented input text.

9. The computer readable medium of claim 1 including instructions readable by a computer which, when implemented, cause the computer to identify proper names in Chinese text.

10. The computer readable medium of claim 1 including instructions readable by a computer which, when implemented, cause the computer to identify full names.

11. The computer readable medium of claim 1 including instructions readable by a computer which, when implemented, cause the computer to identify full names wherein the first portion comprises a family name and the second portion forms at least a part of a given name.

12. The computer readable medium of claim 1 including instructions readable by a computer which, when implemented, cause the computer to identify institutional names.

13. The computer Readable medium of claim 1 including instructions readable by a computer which, when implemented, cause the computer to identify geographical names.

14. A computer readable medium including instructions readable by a computer which, when implemented, cause the computer to identify non-Chinese originated names written with Chinese characters in Chinese text by performing steps comprising:
   locating a sequence of five or more single, Chinese characters in the Chinese text not forming part of a multiple-character word; and
   comparing the sequence of single, Chinese characters to a lexical knowledge base to identify if the Chinese characters contained in the sequence of characters correspond to Chinese characters used in non-Chinese originated names.

15. The computer readable medium of claim 14 including instructions readable by a computer which, when implemented, cause the computer to perform steps comprising:
   locating non-proper name multiple-character words in the Chinese text; and
   identifying characters of the input text comprising each of the multiple-character words.

16. The computer readable medium of claim 15 including instructions readable by a computer which, when implemented, cause the computer to perform a step comprising:
   locating single-character words in the Chinese text.

17. The computer readable medium of claim 16 including instructions readable by a computer which, when implemented, cause the computer to perform steps comprising:
   submitting the non-Chinese originated name, the single-character words and the multiple-character words to a syntactic parser; and
   parsing the Chinese text with the non-Chinese originated name, the single-character words and the multiple-character words.

18. The computer readable medium of claim 17 including instructions readable by a computer which, when implemented, cause the computer to parse the Chinese text as a function of at least some of the words assigned a probability, and perform a step comprising:
   assigning a higher probability to the non-Chinese originated name than at least some of the other words.

19. A computer readable medium comprising
   a lexical knowledge base for use in identifying proper names in input text, the lexical knowledge base comprising:
      for each of a plurality of words, an indication that the word corresponds to a first portion of a proper name;
      for each of a plurality of characters, an indication that the character is part of a second portion of a proper name;
      for each of a plurality of sequences of characters, an indication that the sequence of characters corresponds to all portions of a proper name; and
      for each of a plurality of entries comprising a character sequence, an indication that a first character is a part of the first portion of a proper name and a second character is a first character of the second portion of a proper name.

20. The computer readable medium of claim 19 wherein the indication that the character is part of a second portion includes position information of the character in the proper name.

21. The computer readable medium of claim 19 wherein the knowledge base further comprises:
   for each of a plurality of words, an indication that the word corresponds to a proper name.

22. The computer readable medium of claim 19 wherein the proper name is a full name and the first portion comprises a family name and the second portion comprises a given name.

23. The computer readable medium of claim 22 wherein the indication that the character is part of a given name includes positional information of the character in the given name.

24. The computer readable medium of claim 23 wherein the knowledge base further comprises:
   for each of a plurality of entries comprising a character sequence, an indication that a first character is a family name and a second character is a first character of a given name.

25. The computer readable medium of claim 19 wherein the proper name comprises an institutional name.

26. The computer readable medium of claim 19 wherein the proper name comprises a geographical location.

27. A computer readable medium comprising
   a lexical knowledge base for use in identifying non-Chinese originated names in Chinese text, the lexical knowledge base comprising:
      first field including a character; and
      a second field associated with the first field and including an indication that the character is part of a non-Chinese originated name.

28. A computer readable medium including instructions readable by a computer which, when implemented, cause the computer to create a lexical knowledge base for identifying proper names in input text by performing steps comprising:
   comparing a list of full proper names to be identified and a list of known portions of the full proper names and removing from each of the proper names any known portions contained therein to obtain a list comprising remaining portions of the full proper names; and
   storing indications in the lexical knowledge base for the list of full proper names, for the list of known portions of the full proper names, for the list of remaining portions of the full proper names, for character sequences that a first character is a part of the known portion of a full proper name and a second character is a first character of the remaining portion of a full proper name, and for positional information of characters in each of the remaining portions of the full proper names, wherein the positional information is separate from the list of remaining portions of full proper names.

29. The computer readable medium of claim 28 including instructions readable by a computer which, when implemented, cause the computer to create a lexical knowledge base wherein the known portions comprise family names and the remaining portions comprise given names.

30. The computer readable medium of claim 28 including instructions readable by a computer which, when implemented, cause the computer to create a lexical knowledge base to identify institutional names.

31. The computer readable medium of claim 28 including instructions readable by a computer which, when implemented, cause the computer to create a lexical knowledge base to identify geographical names.

32. A word segmentation method to identify proper names in input text, the method comprising:

locating a sequence of single-characters in the input text not forming part of a multiple-character word;

comparing the sequence of single-characters to a lexical knowledge base to identify if a first portion of the sequence corresponds to stored identifiable portions of a proper name; and comparing the sequence of single-characters to the lexical knowledge base to identify if a second portion of the sequence proximate the first portion includes characters known to comprise a second portion of a proper name;

locating non-proper name multiple-character words in the input text; and identifying characters of the input text comprising each of the multiple-character words.

33. The word segmentation method of claim 32 and further comprising:

submitting the first portion and the second portion to a syntactic parser with other words; and parsing the input text with first portion, the second portion and the other words.

34. The word segmentation method of claim 32 and further comprising:

assigning an indication of probability that the first portion and the second portion corresponding to a proper name.

35. The word segmentation method of claim 34 wherein assigning the indication of probability is a function of words proximate the first and second portions.

36. The word segmentation method of claim 32 wherein the step of comparing the sequence of single-characters to the lexical knowledge base to identify if the second portion of the sequence includes characters known to comprise the second portion of a proper name includes comparing as a function of character position.

37. The word segmentation method of claim 36 wherein the step of comparing the sequence of single-characters to the lexical knowledge base to identify if the second portion of the sequence includes characters known to comprise the second portion of a proper name, includes:

forming a record if adjacent single-characters are known to comprise the second portion as a function of character position.

38. The word segmentation method of claim 32 wherein the method identifies proper names in unsegmented input text.

39. The word segmentation method of claim 32 wherein the method identifies proper names in Chinese text.

40. The word segmentation method of claim 32 wherein the method identifies at least one of full names, institutional names and geographical names.

41. A word segmentation method to identify non-Chinese originated names contained in Chinese text, the method comprising:

locating a sequence of three or more single, Chinese characters in the Chinese text not forming part of a multiple-character word; and comparing the sequence of single, Chinese characters to a lexical knowledge base to identify if the Chinese characters contained in the sequence of characters correspond to Chinese characters used in non-Chinese originated names.

42. The word segmentation method of claim 41 and further comprising:

locating non-proper name multiple-character words in the Chinese text; and identifying characters of the Chinese text comprising each of the multiple-character words.

43. The word segmentation method of claim 42 and further comprising:

locating single-character words in the Chinese text.

44. The word segmentation method of claim 43 and further comprising:

submitting the non-Chinese originated name, the single-character words and the multiple-character words to a syntactic parser; and parsing the Chinese text with the non-Chinese originated name, the single-character words and the multiple-character words.

45. The word segmentation method of claim 44 and further comprising:

assigning a higher probability to the non-Chinese originated name than at least some of the other words.

* * * * *